United States Patent [19]

Hellmann

[11] Patent Number: 4,732,554

[45] Date of Patent: Mar. 22, 1988

[54] APPARATUS FOR REMOVING INJECTION MOLDED ARTICLES FROM INJECTION MOLDING MACHINES

[75] Inventor: Dieter Hellmann, Beilngries, Fed. Rep. of Germany

[73] Assignee: Battenfeld Maschinenfabriken GmbH, Meinerzhagen, Fed. Rep. of Germany

[21] Appl. No.: 39,535

[22] Filed: Apr. 16, 1987

[30] Foreign Application Priority Data

Apr. 18, 1986 [DE] Fed. Rep. of Germany ....... 3613074

[51] Int. Cl.⁴ .............................................. B29C 45/42
[52] U.S. Cl. ..................................... 425/139; 156/538; 414/225; 425/422; 425/444; 425/556; 901/6
[58] Field of Search ....................... 156/538, 571, 572; 425/126 R, 139, 190, 422, 436 R, 444, 556; 414/225, 719, 737; 901/6, 7, 15, 18

[56] References Cited

U.S. PATENT DOCUMENTS

| | | | |
|---|---|---|---|
| 3,665,148 | 5/1972 | Yasenchak et al. | 901/7 |
| 3,760,956 | 9/1973 | Burch | 901/7 |
| 4,408,973 | 10/1983 | Tanaka | 425/139 |
| 4,557,655 | 12/1985 | Berg | 901/7 |
| 4,571,320 | 2/1986 | Walker | 425/139 |

Primary Examiner—Jay H. Woo
Assistant Examiner—Timothy W. Heitbrink
Attorney, Agent, or Firm—Toren, McGeady & Associates

[57] ABSTRACT

An apparatus for removing injection molded articles from an opened injection mold of an injection molding machine. The apparatus has a low structural weight and provides exact control of the movements of a grasping member for grasping the injection molded articles. The apparatus has a guide bed and a carriage movably mounted on the guide bed. The guide bed is aligned parallel to the direction of operation of the closing unit of the injection mold. The carriage includes a cantilever which extends transversely of the guide bed. The cantilever carries a slide member longitudinally movable on the cantilever. An adjustable support member is mounted on the slide member. The grasping member is mounted at the lower end of the support member. The grasping member is adjustable relative to the support member about at least two joints extending perpendicularly to each other. In addition to the drive for the carriage and the drive for the support member, the drive for the support member is also mounted on the carriage above the guide bed. Accordingly, the weight of the drive for the support member does not rest on the cantilever, the slide member and the support member.

8 Claims, 4 Drawing Figures

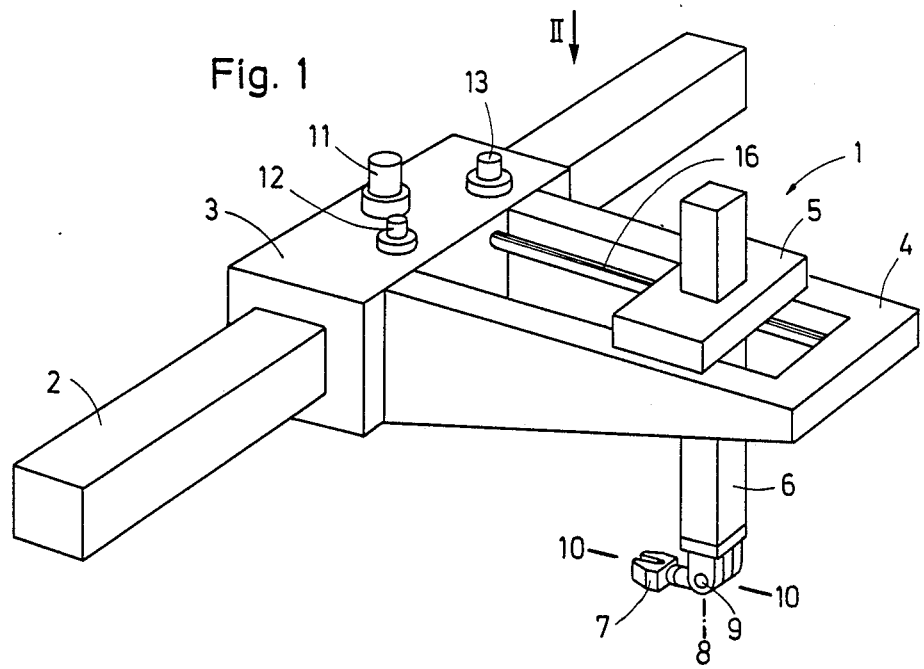
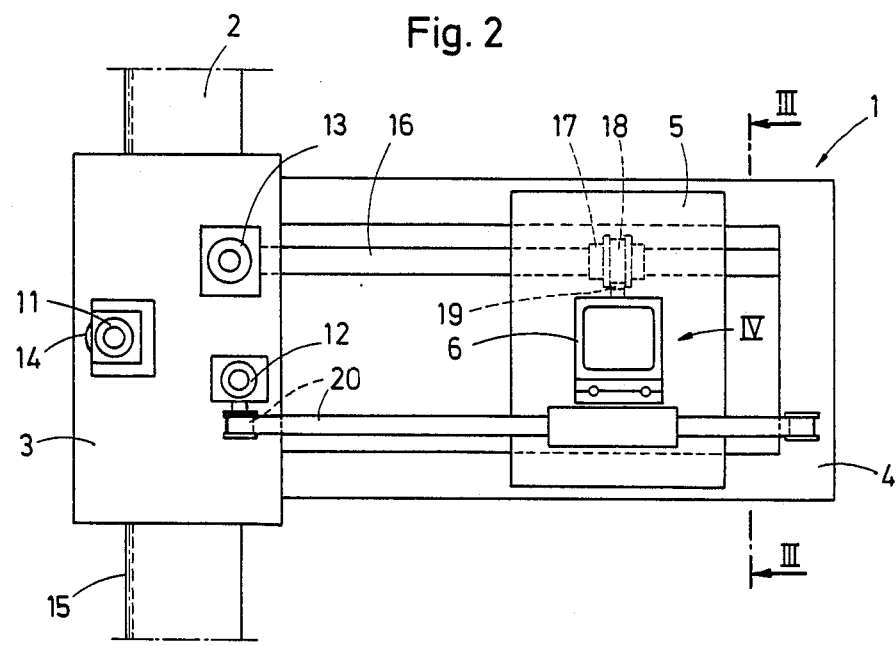

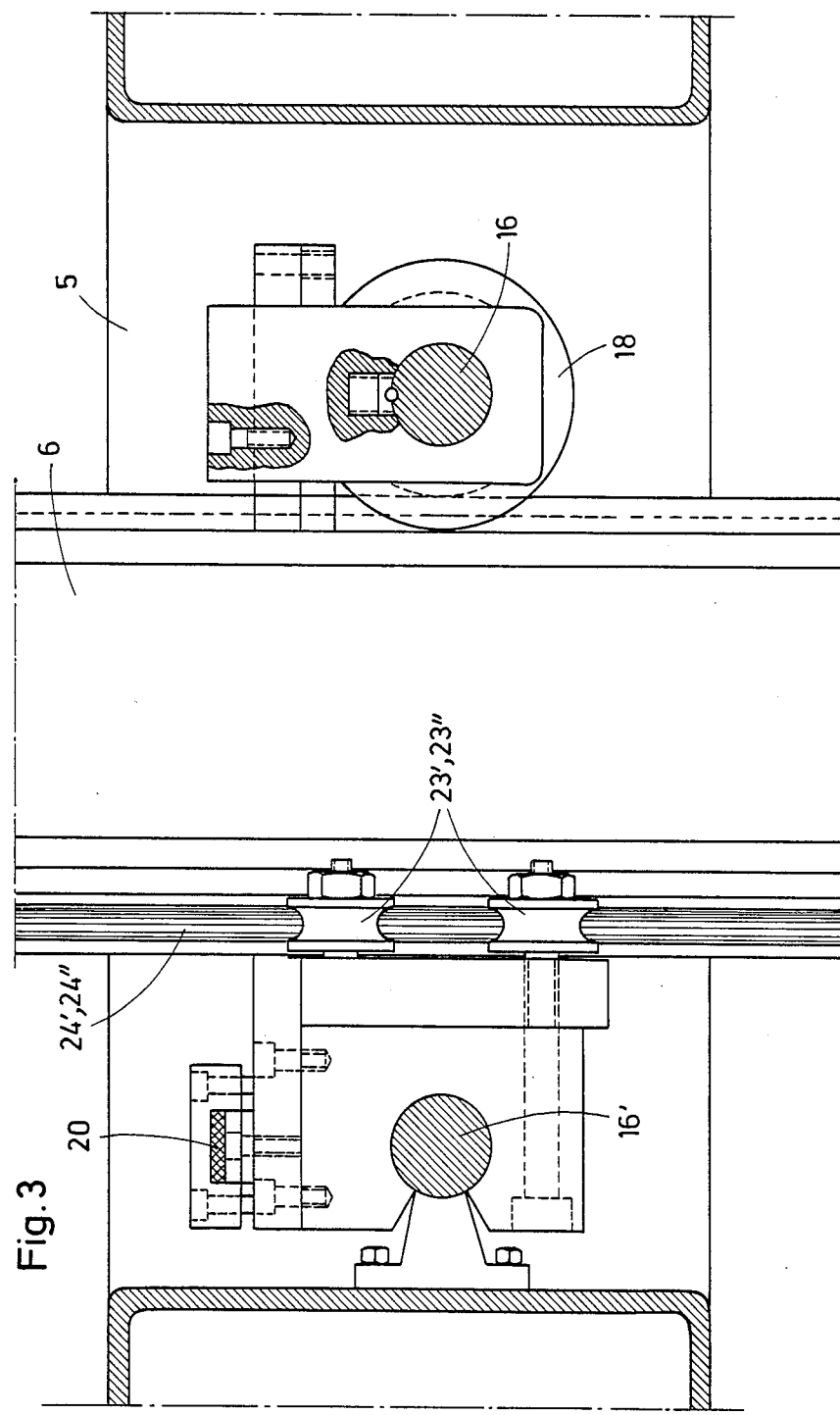

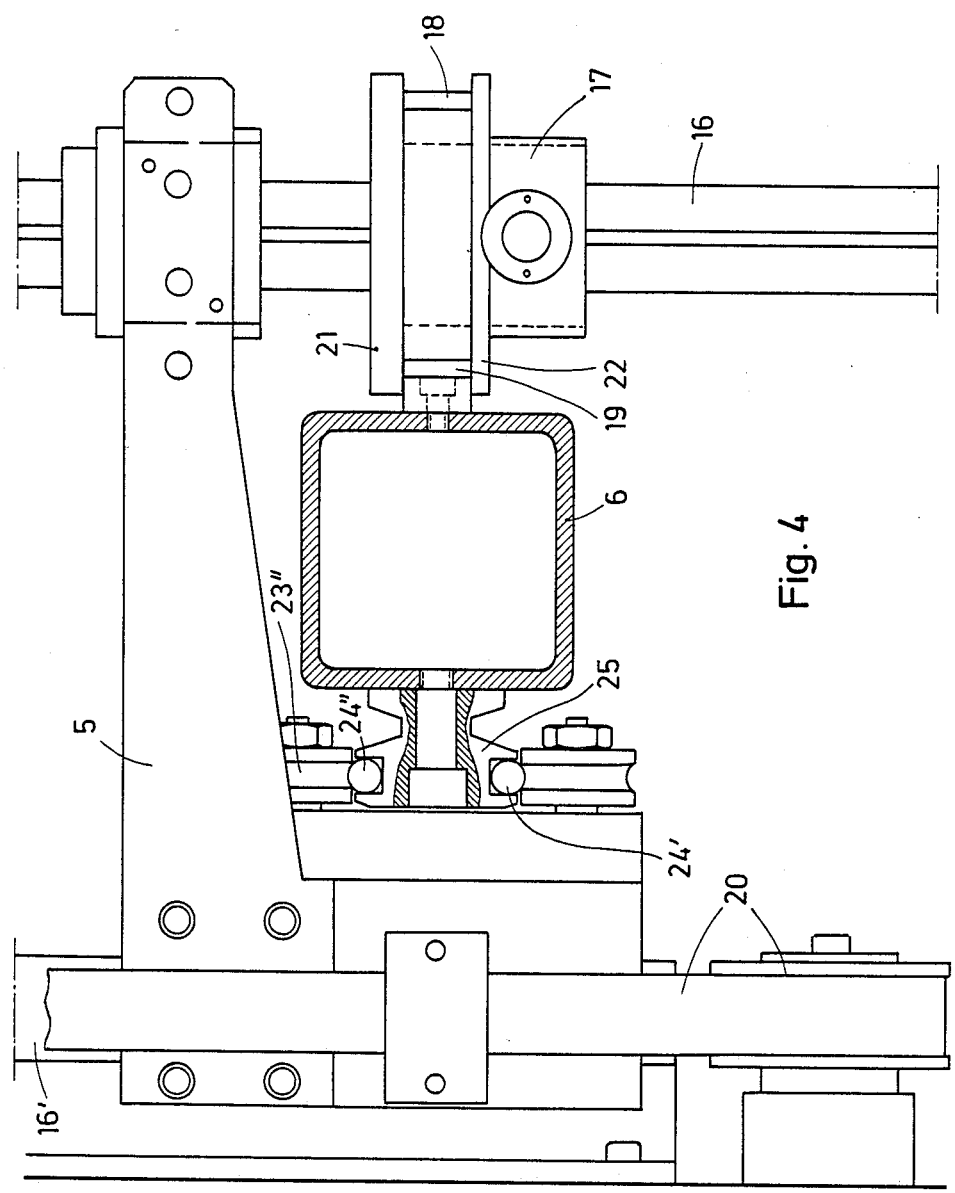

APPARATUS FOR REMOVING INJECTION MOLDED ARTICLES FROM INJECTION MOLDING MACHINES

BACKGROUND OF THE INVENTION

1. Field of the Invention

The present invention relates to an apparatus for removing injection molded articles from the opened injection mold of an injection molding machine. The apparatus includes a carriage which is movably mounted on a guide bed. The guide bed is aligned parallel to the direction of operation of the closing unit for the injection mold. The carriage includes a cantilever which extends transversely of the guide bed. The cantilever carries a slide member longitudinally movable on the cantilever. A support member is mounted in the slide member so as to be adjustable in upward and downward directions. The support member has at its lower end a grasping member for injection molded articles. The grasping member is adjustable relative to the support member about at least two joints which extend perpendicularly to each other.

2. Description of the Prior Art

In a known apparatus for removing injection molded articles from injection molding machines, the drive for moving the carriage along the guide bed and the drive for moving the slide member along the cantilever are mounted on the carriage. The power is supplied to these drives through trailing power supply cables which are connected to the carriage and can be moved along the guide bed in accordance with the movements carried out by the carriage.

Also, in known apparatus for removing injection molded articles from injection molding machines, the drive for the upward and downward movement of the support member, as well as the drives for opening and closing and for turning and tilting the grasping member carried by the support member, are mounted in the slide member which is movable on the cantilever.

In this known embodiment of an apparatus for removing injection molded articles from injection molding machines, it is a disadvantage that the slide member must be able to cooperate with trailing power supply cables which are moved alongside the cantilever. In addition, the load applied to the cantilever does not only include the weight of the slide member and of the support member carried by the slide member, but also the drives carried by the slide member and the support member.

In order to ensure an exact control of the movements of the grasping member for the injection molded articles relative to the closing unit and the injection mold of the injection molding machine, while permitting a freely programmable construction of the apparatus, it is necessary in the known apparatus described above that all interacting operating units are of stiff and, thus, structurally strong design.

It is, therefore, the primary object of the present invention to overcome the disadvantages of the known apparatus for removing injection molded articles from injection molding machines described above. Specifically, an apparatus is to be provided which has a relatively small structural weight, while still ensuring a very exact control movement of the grasping member relative to the closing unit or the injection mold.

SUMMARY OF THE INVENTION

In accordance with the present invention, in addition to the drive for the carriage and the drive for the slide member, the drive for the support member is also mounted on the carriage above the guide bed. The guidance for the slide member on the cantilever includes at least one rotatable shaft which extends in the longitudinal direction of the cantilever. This shaft is coupled to the drive for the support member on the carriage. In addition, the shaft includes a drive member extending over its entire length. An exclusively rotatable transmission element is mounted in the slide member. The transmission element is mounted longitudinally movable on the shaft, but is in rotational engagement with the drive member of the shaft. The transmission element is in continuous drive connection with a linear drive of the support member.

It is an advantage of the apparatus according to the invention that the cantilever merely has to absorb the weight of the slide member and of the support member carried by the slide member and, therefore, the cantilever can be of light-weight construction. Moreover, it is of particular advantage if, in accordance with the present invention. The transmission element is formed by at least one torque bushing which simultaneously forms a longitudinal guide element for the slide member on the shaft or the cantilever.

In accordance with the present invention, it is further advantageous if the driven portion of the bushing is connected to or preferably carries a pinion which is in continuous engagement with a rack forming part of the support member. This rack is preferably made of a wear-resistant polyamide plastics material having a relatively light weight.

In accordance with a particularly advantageous embodiment of the invention, two parallel shafts with transmission elements are arranged in the cantilever. Both shafts interact with the slide member. Moreover, the two shafts may be coupled to the drive for the support member in order to obtain synchronous movement.

In accordance with a particularly advantageous embodiment of the apparatus according to the invention, the support member is composed of two telescoping longitudinal portions, wherein each of the two longitudinal portions carries its own rack and wherein each rack is in engagement with a transmission element of one of the two shafts.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 1 is a schematic perspective view of the apparatus for removing injecting molded articles from injection molding machines according to the present invention;

FIG. 2 is a top view of the apparatus of FIG. 1 seen in direction of arrow II—II;

FIG. 3 is a sectional view, on a larger scale, taken along sectional line III—III in FIG. 2; and FIG. 4 is a top view, on a larger scale, of a detail of the apparatus indicated in FIG. 2 with arrow IV—IV.

DETAILED DESCRIPTION OF THE INVENTION

As illustrated in FIG. 1 of the drawing, an apparatus 1 for removing injection molded articles from injection molding machines includes a guide bed 2 which is mounted on an injection molding machine and extends, for example, parallel to the direction of operation of the closing unit for the injection mold. A carriage 3 is movable along guide bed 2. Carriage 3, in turn, carries a cantilever 4 extending transversely of guide bed 2. A slide member 5 is longitudinally movably mounted on cantilever 4. Slide member 5 carries a support member 6 which is mounted in slide member 5 so as to be movable in upward and downward direction.

Attached to the lower end of support member 6 is a grasping member 7 for grasping injection molded articles. Grasping member 7 is adjustable about a vertical axis 8 relative to support member 6. In addition, grasping member 7 can be tilted relative to support member 6 about a horizontal axis 9. Finally, grasping member 7 can also be rotated about a longitudinal axis 10—10.

Thus, the apparatus 1 illustrated in FIG. 1 forms a manipulator which is linearly movable in the direction of three coordinates and whose grasping member 7 additionally can be rotatably moved about three additional axes.

An important structural feature of the apparatus 1 according to the present invention resides in the fact that not only drive 11 for slidably moving carriage 3 along guide bed 2 and the drive 12 for longitudinally moving slide member 5 on cantilever 4 are mounted on the carriage 3 above guide bed 2, but that, additionally, drive 13 for raising and lowering the support member 6 in vertical direction relative to slide member 5 is also arranged above guide bed 2 in carriage 3.

Only the drive for opening and closing grasping member 7 and the three drives required for rotatably moving grasping member 7 about axes 8, 9 and 10 are mounted on support member 6 and/or in support member 6. However, since the forces necessary for effecting these movements are relatively small, these drives can be constructed relatively light, so that they do not substantially add to the weight of cantilever 4 through slide member 5.

Drive 11 for carriage 3 interacts directly through a pinion 14 with a toothing 15 formed in guide bed 2.

Drive 12 for slide member 5 acts on a belt or chain drive 20 which is mounted so as to extend in longitudinal direction of cantilever 4 and which with one of its portions is connected to slide member 5. Of course, a worm could also be provided instead of the belt or chain drive 20. Drive 13 for support member 6 acts on at least one shaft which is mounted in cantilever 4 so as to extend parallel to the longitudinal direction of the cantilever 4. Shaft 16 interacts in the manner of a lead screw, i.e. through a drive member extending over its entire length, with a transmission element 17 constructed as a torque bushing. This transmission element 17 is in continuous engagement for rotation with the shaft 16, but is axially movably mounted thereon. The portion of transmission element 17 which is rotatable relative to slide member 5 has a pinion 18 which is in continuous engagement with a rack 19 which is fastened on support member 6 and extends in the longitudinal direction of the support member 6.

However, shaft 16 not only is a means for power transmission for driving support members 6, but it also serves as a longitudinal guidance for slide member 5 on cantilever 4.

FIG. 3 shows that, in the region where belt or chain drive 20 is mounted, another shaft 16' may be arranged in cantilever 4 extending parallel to shaft 16. This shaft 16' may be in connection with drive 13 and be moved synchronously with shaft 16. In addition to shaft 16, shaft 16' also interacts with slide member 5 through a bushing and, thus, shaft 16 forms a further longitudinal guidance for slide member 5. The portion of the transmission element which is rotatable relative to the slide member also carries a pinion 18 which meshes a rack 19 mounted on support member 6.

If both shafts 16 and 16' act on a single-piece support member 6, it is, of course, required that the two shafts rotate in opposite directions of rotation. If, on the other hand, support member 6 is formed by two telescoping longitudinal members, the two shafts 16, 16' can operate in the same direction of rotation. However, in this case, it would be advantageous to select the transmission ratio between the second shaft 16' and the lower telescoping portion of support member 6 greater, for example, twice as great, than the transmission ratio between the first shaft and the upper telescoping portion of support member 6. This would create a differential drive for support member 6 which would permit faster lifting and lowering movements of grasping member 7.

FIGS. 3 and 4 further show that support member 6 advantageously has triple guidance in slide member 5. This triple guidance is obtained, on the one hand, by rack 19 which interacts with spur wheels 21 and 22 arranged on both side of pinion 18, and, on the other hand, by two pairs of rollers 23' and 23" rotatably supported in slide member 5. Rollers 23' and 23" are in engagement with guide rods 24' and 24" which, in turn, are in connection with support member 6 over the entire length thereof by means of holding elements 25.

Finally, it should be noted that the torque bushings provided as transmission elements between shafts 16 and 16', slide member 5 and support member 6 are of known design. The bushings facilitate a smooth axial movement by means of a ball which is held in the bushing and is seated in a longitudinal groove of the shaft. However, when the shaft is turned, the ball seated in the longitudinal groove has a driving effect on a portion of the bushing which forms pinion 18 which, in turn, meshes with rack 19. Rack 19 may be made of a wear-resistant polyamide.

While specific embodiments of the invention have been shown and described in detail to illustrate the application of the inventive principles, it will be understood that the invention may be embodiment otherwise without departing from such principles.

I claim:

1. An apparatus for removing injection molded articles from an opened injection mold of an injection molding machine, the injection mold including a closing unit, said apparatus further comprising a guide bed, a carriage movably mounted on the guide bed, the guide bed aligned parallel to the direction of operation of the closing unit, a cantilever attached to the carriage, the cantilever extending transversely of the guide bed, a slide member mounted on the cantilever so as to be movable in longitudinal direction of the cantilever, an adjustable support member having a lower end mounted in the slide member, a grasping member for grasping injection molded articles, the grasping member being attached to the lower end and adjustable relative to the support member about at least two joints extending perpendicularly to each other, a first drive for driving the carriage, a second drive for driving the slide member, and a third drive for driving the support member, the first, second and third drives mounted on the carriage above the guide bed, at least one rotatable shaft mounted in the cantilever and extending in longitudinal direciton of the cantilever, the at least one shaft serving to guide the slide member on the cantilever, the at least one shaft being coupled to the third drive, the at least one shaft including a drive member extending over the entire length of the shaft, an exclusively rotatable transmission element mounted in the slide member, the transmission element being mounted longitudinally movable on the shaft and in rotational engagement with the drive member, and a linear drive attached to the support member, the transmission element being in continuous drive connection with the linear drive.

2. The apparatus according to claim 1, wherein the transmission element is a torque bushing, the torque bushing forming a longitudinal guide element for the slide member on the cantilever.

3. The apparatus according to claim 2, wherein the torque bushing includes a driven portion, the driven portion including a pinion, the support member including a rack, the pinion and the rack being in constant engagement.

4. The apparatus according to claim 3, wherein the driven portion supports the pinion.

5. The apparatus according to claim 1, comprising two rotatable shafts mounted in the cantilever, each rotatable shaft having a transmission element, the two shafts being in operational connection with the slide member.

6. The apparatus according to claim 5, wherein the two shafts are coupled so as to move synchronously with the third drive for the support member.

7. The apparatus according to claim 6, wherein the support member includes two longitudinal portions telescopically movable relative to each other, a rack each connected to the longitudinal portions, each rack shaft including a drive member, wherein each rack is in engagement with the drive member of one of the two shafts.

8. The apparatus according to claim 7, wherein the two shafts rotate in the same direction, and wherein the transmission ratios of the two racks with the transmission elements are different.

* * * * *